A. BRAINERD.
Lockets.
No. 152,066.                       Patented June 16, 1874.
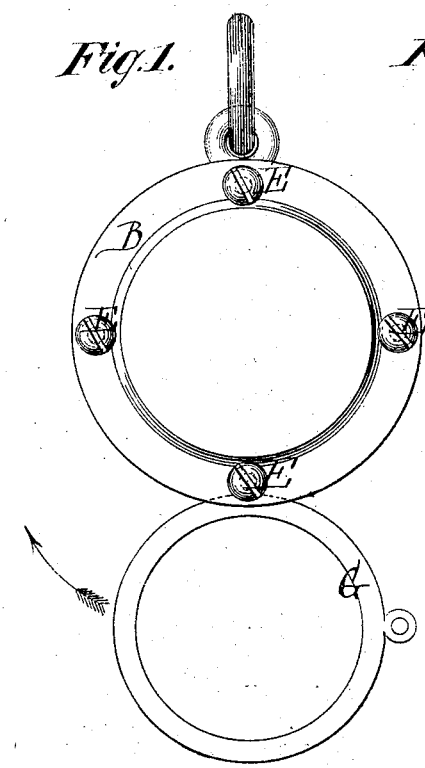
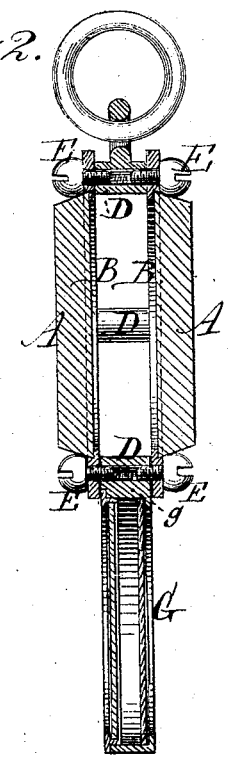
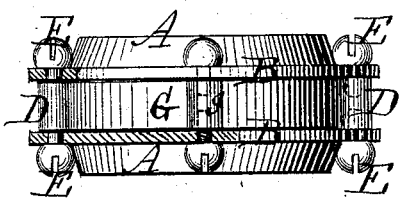

UNITED STATES PATENT OFFICE.

AMASA BRAINERD, OF JERSEY CITY, NEW JERSEY.

IMPROVEMENT IN LOCKETS.

Specification forming part of Letters Patent No. 152,066, dated June 16, 1874; application filed April 28, 1874.

*To all whom it may concern:*

Be it known that I, AMASA BRAINERD, of Jersey City, in the county of Hudson and State of New Jersey, have invented certain Improvements in Lockets, of which the following is a specification:

My invention relates to certain improvements in that class of lockets which are composed of two separate settings attached to each other, whereby the same means serve to secure the stones in the settings, and to attach the settings to each other.

The invention consists in two rings or annular plates formed with recesses for the reception of the stones, in combination with a series of posts and screws or rivets for connecting the rings at a certain distance from each other, and for securing the stones in the settings. The invention consists, further, in the combination, with the plates, posts, and rivets, of a glass-holding rim or bezel, hinged or pivoted so as to be readily inserted and concealed between said plates and stones, and withdrawn therefrom.

In the accompanying drawing, Figure 1 is a face view of my improved locket. Fig. 2 is a central transverse section of the same. Fig. 3 is an edge view.

The stones A are set in rings or annular plates B, which are formed with recesses for their reception. The rings or plates B are connected with each other at a certain distance apart by means of posts D and screws E. The posts D may be tubular when screws are used, and must be tubular when rivets are used instead of screws. The length of the posts depends upon the distance from each other at which it is desired to connect the plates B. When screws are used, one screw is inserted from each side, said screws engaging with threads cut in the posts. When rivets are used, the posts are made tubular throughout, and the rivets are inserted from one side, and upset or riveted down on the other side. The edges of the stones A are beveled or tapered toward the center of the outer side, and the heads of the screws E project slightly over said beveled edges, and thus serve to hold the stones in place in the settings B at the same time that they connect said settings to the posts D. The glass-holding rim or bezel G, for holding the picture or other memento, is made in two parts, one fitting in the other, and both holding glasses, if desired. One of the parts is provided with a socket, *g*, for hinging or pivoting it between the settings, which socket may take the place of one of the posts, and have the screws or rivets engage with it, or it may be large enough to surround the post. By this arrangement, the glass-holding rim or bezel may be readily inserted and concealed between the settings, and as readily withdrawn, when desired.

What I claim as new, and desire to secure by Letters Patent, is—

1. The combination of the rings or annular plates B, formed with recesses for the reception of the stones, the posts D, and rivets or screws E, substantially as and for the purpose shown and described.

2. The combination, with the plates B, posts D, and rivets or screws E, of the glass-holding rim or bezel G, hinged or pivoted thereto by means of the socket *g* and screw E, substantially as shown and described.

AMASA BRAINERD.

Witnesses:
BENJAMIN W. HOFFMAN,
MICHAEL RYAN.